April 28, 1942. J. H. SMITH 2,281,210
MANUFACTURE OF WATER GAS AND APPARATUS THEREFOR
Filed April 3, 1939
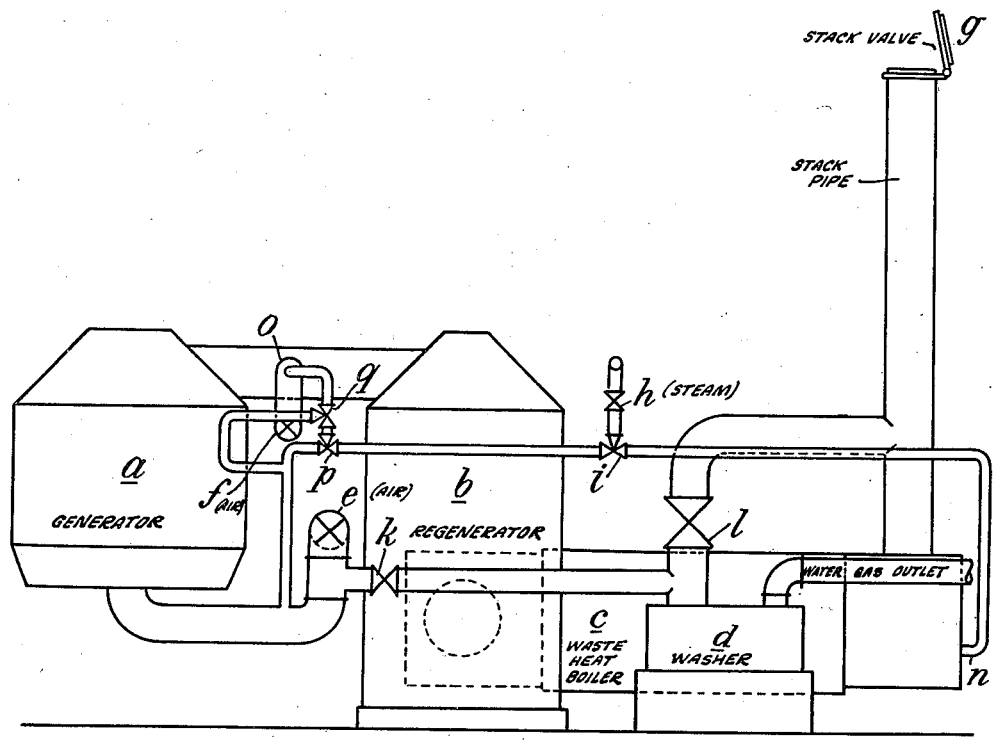
Inventor
Joseph Herbert Smith
By Dowell & Dowell
Attorneys Patented Apr. 28, 1942

2,281,210

UNITED STATES PATENT OFFICE 2,281,210

MANUFACTURE OF WATER GAS AND APPARATUS THEREFOR

Joseph Herbert Smith, Elstree, Herts, England, assignor to Humphreys & Glasgow Limited, London, England Application April 3, 1939, Serial No. 265,802
In Great Britain May 2, 1938

7 Claims. (Cl. 48—82)

This invention has reference to the intermittent manufacture of water gas by a cyclic process in which an ignited fuel bed is alternately blasted with air and steamed to produce water gas, which may be carburetted.

To obtain water gas containing the lowest practicable proportion of inert constituents, particularly nitrogen, it is the practice to displace to atmosphere the waste products of combustion left in the set after each air blasting period by means of steam and the water gas produced from it, and also to displace into the gas holder water gas left in the plant after each steaming period by means of the air blast and the blast gases produced from it.

It is not possible to avoid some mixing of the water gas and the blast products occurring whilst displacing the residual gases, especially when the plant is of large size, so that water gas of high purity can only be obtained by wasting a considerable proportion of water gas.

The object of the present invention is to reduce this waste of water gas.

According to the invention, after blasting the fuel bed with air, the purging of the set is effected by first admitting steam for a very short period at the base of the generator and burning the resulting water gas and expelled blast products in the regenerator or recuperator and waste heat boiler and thereafter, as soon as the gas leaving the generator is sufficiently low in nitrogen, admitting steam between the generator and the regenerator or recuperator so that the waste gases in the set beyond the point of steam admission are expelled to atmosphere by steam alone without waste of water gas. In determining when the steam should be shut off at the base of the generator and admitted at the top, regard should be had to the prescribed quality or analysis of the finished water gas. For example the steam may be shut off at the base of the generator when the gas leaving the generator contains only 1 to 5 per cent of nitrogen. To avoid contamination of water gas left in the plant by blast gases being used to displace the water gas into the gas holder, the operating cycle is arranged so that the gas making period is terminated by a back run, which will leave the spaces in the plant beyond the generator filled with steam, and thereafter steam is admitted to the generator base for just so long as to displace the water gas beneath the grate, any water gas then remaining in the generator being at the commencement of the blow burned in the regenerator or recuperator to store its heat and the displaced steam and the small quantity of products of combustion of the water gas which was left in the generator being discharged to atmosphere.

The accompanying drawing illustrates diagrammatically and by way of example water gas apparatus provided with means for carrying out the invention.

$a$ represents the generator, $b$ the regenerator or recuperator, $c$ a waste heat boiler, $d$ the washer, $e$ the generator air blast valve, $f$ the secondary air blast valve, $g$ the stack valve, $h$ the steam control or working valve, $i$ the three-way valve directing steam from the valve, $h$, $k$ the back-run gas valve, $l$ the up-run gas valve, $n$ the back-run steam inlet, $o$ an inlet to the connection between the top of the generator and the top of the regenerator or recuperator for the admission of secondary air and also for the admission of steam during the latter part of the purge following the blow; $p$ and $q$ are three-way valves the former directing steam to the base of the generator or to the valve $q$ and controlled by the stack valve $g$, and the latter directing steam from the valve $p$ to the inlet $o$ and controlled by the secondary blast valve $f$. The steam pipe system in which the valves $i$, $p$ and $q$ are incorporated comprises branches leading respectively to the base of the generator to the top of the generator and to the outlet end of the regenerator or waste heat boiler and a pipe loop around the valve $p$ and connecting the branches leading respectively to the base and to the top of the generator.

The supply of steam is controlled by the valve $h$ leading to the three way directing valve $i$, whence steam passes to the outlet from the waste heat boiler for back-run gas making or to the three way valve $p$, which is operated by the stack valve $g$ and directs the steam to the three way valve $q$ operated by the secondary air valve $f$ or to the generator base; the valve $q$ directs steam to the generator base when the valve $f$ is open and to the outlet from the top of the generator when the valve $f$ is closed.

In operation, immediately following a blast period, the generator air blast valve $e$ is first closed, the controlling steam valve $h$ is next opened, the steam directing three-way valve $i$ being set to the up-run position, so that steam flows through the three-way valves $p$ and $q$ to the generator base, sweeping out the air etc. left in the space beneath the grate in the generator. This generator steam purge, during which the mixture of water gas and blast gases from the generator is burned with air, admitted through the valve $f$, in the regenerator or recuperator, is continued until the water gas passing through the outlet at the top of the generator is sufficiently low in nitrogen content. The valve $f$ is then closed, whereby the three way steam directing valve $q$ is moved to direct the flow of steam to the inlet $o$, so that the regenerator or recuperator waste heat boiler and all connections are purged with steam alone until the blast products have been expelled at the stack, the stack valve $g$ is then closed and its closing action reverses the valve $p$ so that the steam is passed direct therefrom to the base of the generator for an up-run the water gas produced passing through the regenerator or recuperator $b$, waste heat boiler $c$ and the valve $l$ to the wash box $d$ and storage.

When a back-run is to be made the valve $i$ is reversed by the operating mechanism so that steam passes by way of the inlet $n$ through the waste heat boiler $c$, in the example illustrated, and the regenerator or recuperator $b$ and down the generator $a$, the water gas passing through the valve $k$ to the wash box $d$ and storage, the valve $l$ being closed. On completion of the back-run, the gas valves $k$ and $l$ are reversed, and, for a short interval, the steam is led to the base of the generator to purge it of water gas. The steam is then shut off and the stack valve $g$ and the blast valve $f$ simultaneously opened; on the generator blast valve $e$ being then opened, the water gas left in the generator is driven out and burned and its heat utilised in the regenerator or recuperator, the blow being then continued and the blast gases burned with secondary air and the products of combustion discharged in the usual way.

In carrying out the present invention, the gas making or run period comprises two or more short down or back runs separated from each other by an interposed up-run, this "split" run commencing and terminating with a down or back run.

What I claim is:

1. Apparatus for carrying out the method of operation described comprising a generator, an air supply pipe to the generator base, a regenerator, an outlet from the generator to the regenerator, a secondary air supply pipe to said outlet, a pipe leading from the outlet end of the regenerator to atmosphere, a stack valve thereon, a steam supply main, a steam supply pipe system leading therefrom and comprising three branches leading respectively to the base of the generator, to the generator top and to the outlet end of the regenerator, a three way valve at the junction of said steam supply pipe system with said main, a three way valve at the junction of the branches leading respectively to the base and top of the generator, a pipe loop connecting these two branches and a third three way valve at the junction of said pipe loop with the branch to the generator top.

2. In the manufacture of water gas by a cyclic process in which an ignited fuel bed in a generator is alternately blasted with air and steamed to produce water gas, blasting the fuel bed with air, shutting off the air and purging the set by first admitting steam at the base of the generator and burning with secondary air beyond the generator the resulting water gas and expelled blast products until the gas is low in nitrogen, shutting off the steam from the base of the generator and the secondary air and then admitting steam at the outlet from the generator so that steam alone flows away from the fuel bed and expels the waste gases in the set beyond the generator to atmosphere, steaming the fuel bed to make water gas and terminating the water gas making period by a back run to leave the plant beyond the generator filled with steam and the space beneath the grate filled with water gas, storing the water gas made during the gas making period, displacing by steam through the generator grate the water gas left beneath the generator at the end of the back run and then again blasting the fuel bed with air and burning water gas thereby displaced from the generator to store its heat, the displaced steam and water gas combustion products being discharged to atmosphere.

3. In the manufacture of water gas as set forth in claim 2, the steaming of the fuel bed to make water gas consisting of a "split" run comprising two or more short down or back runs separated from each other by an interposed up-run, said "split" run commencing and terminating with a down or back run.

4. In the manufacture of water gas by a cyclic system including generator and recuperator in which an ignited fuel bed in the generator is alternately blasted with air and steamed to produce water gas, the steps of blasting the fuel bed with air to bring same to incandescence, shutting off the air blast, purging the system by first passing a short up-run of steam through the generator fuel bed and burning the resulting water gas and expelled blast products with secondary air admitted beyond the fuel bed for such period that the water gas leaving the generator is low in nitrogen content, the heat developed by such burning being recovered in the recuperator, then shutting off the said up-run and the secondary air, admitting steam into the outlet of the generator to fill the system beyond the generator with steam which alone serves to expel the waste gases and purge the system beyond the generator, and then starting the gas making or run period.

5. In the manufacture of water gas as set forth in claim 4, the gas making or run period consisting of a "split" run comprising two or more short down or back runs separated from each other by an interposed up-run, said "split" run commencing and terminating with a down or back run.

6. In the manufacture of water gas by a cyclic system including a generator and recuperator in which the generator is alternately blasted with air and steamed to produce water gas, the steps of terminating the water gas making period by a back-run to leave the system beyond the generator filled with steam while the space beneath the generator grate is filled with water gas, admitting steam to the generator below the grate to displace through said grate, the water gas beneath the grate, commencing the blow by blasting with primary air, burning the water gas thus displaced with secondary air admitted above the fuel bed, the heat developed by said burning being stored in the recuperator, discharging the displaced steam and products of combustion of the water gas to the atmosphere, and then starting the gas making or run period.

7. In the manufacture of water gas as set forth in claim 6, the gas making or run period consisting of a "split" run comprising two or more short down or back-runs separated from each other by an interposed up-run, said "split" run commencing and terminating with a down or back-run.

JOSEPH HERBERT SMITH.